United States Patent
Ammoura et al.

(10) Patent No.: US 10,878,490 B2
(45) Date of Patent: Dec. 29, 2020

(54) SECURE AND AUTOMATED VEHICULAR CONTROL USING AUTOMATED AUTHENTICATION

(71) Applicant: 2162256 ALBERTA LTD., Edmonton (CA)

(72) Inventors: Ayman Ammoura, Edmonton (CA); David Mulcair, Edmonton (CA)

(73) Assignee: 2162256 ALBERTA LTD., Edmonton (CA)

( * ) Notice: Subject to any disclaimer, the term of this patent is extended or adjusted under 35 U.S.C. 154(b) by 0 days.

(21) Appl. No.: 16/945,758

(22) Filed: Jul. 31, 2020

(65) Prior Publication Data

US 2020/0364776 A1 Nov. 19, 2020

Related U.S. Application Data

(63) Continuation-in-part of application No. 16/657,773, filed on Oct. 18, 2019, now Pat. No. 10,762,734, and a continuation-in-part of application No. 16/230,857, filed on Dec. 21, 2018, now Pat. No. 10,733,819.

(51) Int. Cl.
*G06Q 30/06* (2012.01)
*G06F 21/31* (2013.01)
*H04L 29/08* (2006.01)
*G01S 19/51* (2010.01)

(52) U.S. Cl.
CPC .......... *G06Q 30/0645* (2013.01); *G01S 19/51* (2013.01); *G06F 21/31* (2013.01); *H04L 67/10* (2013.01); *H04L 67/18* (2013.01); *H04L 67/303* (2013.01); *H04L 67/26* (2013.01)

(58) Field of Classification Search
None
See application file for complete search history.

(56) References Cited

U.S. PATENT DOCUMENTS

| 5,267,159 A | 11/1993 | O'Neall |
| 5,519,255 A * | 5/1996 | Burtch ............... B60R 25/04 180/287 |
| 5,550,738 A | 8/1996 | Bailey et al. |
| 6,526,341 B1 | 2/2003 | Bird et al. |

(Continued)

FOREIGN PATENT DOCUMENTS

CA 3065781 A1 6/2020

OTHER PUBLICATIONS

Strouth, Jennifer, "What is an API? Key Fleet Management Integrations," Verizon Connect, [online], 2019, [retrieved on Oct. 9, 2019], Retrieved from the Internet: <URL: https://www.verizonconnect.com/resources/article/key-telematics-api-integrations/>, 6 pages.

(Continued)

*Primary Examiner* — Carlos Garcia
(74) *Attorney, Agent, or Firm* — Carr & Ferrell LLP

(57) ABSTRACT

Secure and automated vehicular control using automatic authentication is disclosed herein. An example system includes a processor; and memory, the processor being configured to execute instructions stored in memory to automatically track a signal associated with a vehicle in motion, automatically track a signal associated with a mobile device in motion, determine that the vehicle and the mobile device are moving in sync, and automatically authenticate a user associated with the mobile device to the vehicle.

20 Claims, 7 Drawing Sheets

(56) References Cited

U.S. PATENT DOCUMENTS

| | | | |
|---|---|---|---|
| 6,718,235 B1 | 4/2004 | Borugian | |
| 6,741,933 B1 | 5/2004 | Glass | |
| 6,807,481 B1 | 10/2004 | Gastelum | |
| 6,856,933 B1 | 2/2005 | Callaghan | |
| 7,555,378 B2 | 6/2009 | Larschan et al. | |
| 7,599,770 B2 | 10/2009 | Hardy | |
| 8,538,789 B1 | 9/2013 | Blank et al. | |
| 8,768,565 B2 * | 7/2014 | Jefferies | G07C 9/00571 |
| | | | 701/32.7 |
| 9,031,710 B2 | 5/2015 | Barrett | |
| 9,094,436 B2 | 7/2015 | Westra et al. | |
| 9,245,391 B2 | 1/2016 | Cook et al. | |
| 9,589,393 B2 | 3/2017 | Botnen | |
| 9,633,487 B2 | 4/2017 | Wright | |
| 9,633,568 B2 | 4/2017 | Mohn et al. | |
| 9,685,098 B1 | 6/2017 | Kypri | |
| 9,688,247 B1 * | 6/2017 | Jayaraman | G07C 9/00309 |
| 9,721,305 B2 | 8/2017 | Bomze et al. | |
| 9,872,225 B2 | 1/2018 | Guba et al. | |
| 9,911,255 B2 * | 3/2018 | Lee | G07C 9/20 |
| 9,953,366 B1 | 4/2018 | Rogers et al. | |
| 10,127,743 B2 | 11/2018 | Otzurk et al. | |
| 10,137,848 B2 | 11/2018 | Decia | |
| 10,171,950 B2 | 1/2019 | Diem | |
| 10,210,679 B1 | 2/2019 | Higgs et al. | |
| 10,479,370 B2 * | 11/2019 | Gong | B60W 40/08 |
| 10,733,819 B2 | 8/2020 | Ammoura et al. | |
| 10,762,734 B2 | 9/2020 | Ammoura et al. | |
| 2002/0107833 A1 | 8/2002 | Kerkinni | |
| 2003/0139878 A1 * | 7/2003 | DeLuca | G01C 21/26 |
| | | | 701/36 |
| 2006/0200286 A1 | 9/2006 | Kumagai et al. | |
| 2007/0208503 A1 | 9/2007 | Harnsberger | |
| 2007/0250258 A1 | 10/2007 | Hager | |
| 2009/0292418 A1 | 11/2009 | Kuykendal | |
| 2010/0094482 A1 | 4/2010 | Schofield et al. | |
| 2011/0112969 A1 | 5/2011 | Zaid et al. | |
| 2011/0130916 A1 | 6/2011 | Mayer | |
| 2014/0156111 A1 | 6/2014 | Ehrman | |
| 2015/0120151 A1 * | 4/2015 | Akay | B60R 25/24 |
| | | | 701/49 |
| 2015/0127253 A1 | 5/2015 | Torres Hurtado et al. | |
| 2016/0110820 A1 | 4/2016 | Fleck et al. | |
| 2017/0349142 A1 | 12/2017 | Krishnan | |
| 2018/0025328 A1 * | 1/2018 | Penilla | G06Q 10/06314 |
| | | | 705/305 |
| 2018/0308295 A1 | 10/2018 | Kwak | |
| 2018/0365705 A1 | 12/2018 | Harter et al. | |
| 2019/0026962 A1 | 1/2019 | Gintz et al. | |
| 2019/0095358 A9 | 3/2019 | Cawse et al. | |
| 2020/0200649 A1 | 6/2020 | Ammoura et al. | |
| 2020/0202646 A1 | 6/2020 | Ammoura et al. | |
| 2020/0202648 A1 | 6/2020 | Ammoura et al. | |

OTHER PUBLICATIONS

"Software that Transportation Companies can rely on," Verizon Connect [online], 2019, [retrieved on Oct. 9, 2019], Retrieved from the Internet: <URL: https://www.verizonconnect.com/industries/gps-truck-tracking/>, 4 pages.

Martens et al., "Access to digital car data and competition in aftersales services," JRC Digital Economy Working Sep. 2018, pp. 8-10.

"Toyota Adds Fleet complete Data Platform," AutomativeFleet.com, [online], Sep. 26, 2018, [retrieved on Oct. 9, 2019], Retrieved from: <URL: https://www.automotive-fleet.com/314227/toyota-fleet-complete-to-enhance-fleet-vehicle-data>, 2 pages.

"Connvex for OEMs and Suppliers," Connvex.com, [online], 2019, [retrieved on Oct. 9, 2019], Retrieved from the Internet <URL:https://www.connvex.com/connvex-for-oems>, 6 pages.

Sridhar, "How Geotab Cloud ELD Works," Geotab.com, [online], Aug. 11, 2017, [retrieved on Oct. 9, 2019], Retrieved from the Internet: <https://www.geotab.com/blog/cloud-eld/>, 9 pages.

"ELD Compliance," KeepTruckin.com, [online], 2019, [retrieved on Oct. 9, 2019], Retrieved from the Internet: <URL:https://keeptruckin.com/eld-compliance>, 6 pages.

"ELD Compliance Solution," Samsara.com [online], 2019, [retrieved on Oct. 9, 2019], Retrieved from the Internet: <URL:https://www.samsara.com/fleet/eld-compliance>, 13 pages.

Abrosimova, Kate, "How to Develop a Mobile HOS Electronic Logbook App for Long-Haul Drivers in the US," Yalantis.com [online], 2019, [retrieved on Oct. 9, 2019], Retrieved from the Internet: <URL:https://yalantis.com/blog/how-can-you-develop-hos-electronic-logbook-app-for-your-long-haul-drives/>, 7 pages.

"Original Equipment Manufacturer (OEM) GPS Development," RhinoFleetTracking.com, [online], 2019, [retrieved on Oct. 9, 2019], Retrieved from the Internet: <URL:https://www.rhinofleettracking.com/gps-fleet-tracking/oem-gps-development>, 3 pages.

Novosilska, Lyudmyla, "10 Companies Impacting the Connected Car Ecosystem Through APIs ," IgniteOutsourcing.com, [online], 2019, [retrieved on Oct. 9, 2019], Retrieved from the Internet: <URL:https://igniteoutsourcing.com/automotive/connected-car-api>, 13 pages.

"Electronic Logging Device Technical Specifications Frequently Asked Questions," U.S. Department of Transportation, Federal Motor Carrier Safety Administration, Revised; [online], Sep. 2017, [retrieved on Oct. 9, 2019), Retrieved from the Internet: <Url:https://www.google.com/url? sa=t&rct=j&q=&esrc=s&source=web&cd=10&cad=rja&uact=8&ved=2ahUKEwjS7SvxYJAhWsxVkKHaUAD_8QFjAlegQIABAC&url=https%3A%2F %2Feld.fmcsa.dot.gov% 2FFile%2FIndex% 2F92060164-38df-0e7a-e053-0100007fdb4c &usg=A0vVaw2uRAPGcsB90T7aL3J8r3FW>, 19 pages.

"MileIQ, How it Works," MileIQ.com, [online], 2019, [retrieved on Oct. 9, 2019], Retrieved from the Internet: <URL:https://www.mileiq.com/howitworks/>, 9 pages.

"MileIQ Tutorial—How to get started," MilelQ, published on Youtube.com, [online], Jan. 19, 2018, [retrieved on Retrieved from the Internet: <URL:https://www.youtube.com/watch?v=mCnQGj6a924,>, 1 page, Oct. 9, 2019].

"TripLog Webinar—Quick Guide to Mileage Tracking for Small Business," TripLog, published on Youtube.com, [online], Jan. 19, 2018, [retrieved on Oct. 9, 2019], Retrieved from the Internet: <URL:https://www.youtube.com/ watch?v=6XJr2nXgXrw,>, 1 page.

"How to Automatically Track Your Mileage with QuickBooks Self-Employed on Your Mobile I AUS," QuickBooks, published on Youtube.com, [online], Jan. 19, 2018, [retrieved on Oct. 9, 2019], Retrieved from the Internet: <URL:https://www.youtube.com/watch?v=230aQPAtsc8,>, 1 page.

"Mileage Ace Pro," Milage-Ace.com, [online], 2019, [retrieved on Oct. 9, 2019], Retrieved from the Internet: <URL:https://www.mileage-ace.com/mileage-tracker/pro/>, 4 pages.

"Automatic mileage tracker & expense log," Everlance.com, [online], 2019, [retrieved on Oct. 9, 2019], Retrieved from Internet: <URL:https://www.everlance.com/>, 15 pages.

YouTube: "Car2go, How to use car2go—use the app to begin a rental"[online], [retrieved on Jun. 14, 2016] Retrieved from the Internet: <https://www.youtube.com/watch?v=tjX5IVAqQcs>.

\* cited by examiner

SECURE AND AUTOMATED VEHICULAR CONTROL USING AUTOMATED AUTHENTICATION

CROSS REFERENCE TO RELATED APPLICATIONS

The present patent application is a continuation-in-part of U.S. application Ser. No. 16/230,857 filed on Dec. 21, 2018 entitled "Secure and Automated Vehicular Control Using Multi-factor Authentication", and also a continuation-in-part of U.S. application Ser. No. 16/657,773 filed on Oct. 18, 2019 entitled "Automatically Generating a Commercial Driver Logbook Based on Vehicular Data". The disclosures of the above-referenced applications are hereby incorporated by reference in their entirety for all purposes.

FIELD OF THE INVENTION

The present technology pertains to vehicles, and more particularly, but not by way of limitation, to systems and methods that provide for secure and automated vehicular control using multi-factor authentication.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes receiving a message from a mobile device or an orchestration service, the message comprising an identifier that is generated by any of an application residing on the mobile device or the orchestration service; unlocking, by the vehicle controller, a door of the vehicle after a first type of authentication of a user is completed based on the identifier; and receiving a code by a human machine interface of the vehicle as a second type of authentication of the user, the coding being transmitted to the mobile device by a cloud service.

Another general aspect includes a method, including performing a first type of authentication of a user based on an identifier received from a mobile device; unlocking a door of a vehicle when the first type of authentication is complete; performing a second type of authentication of the user that is based on verification of a code transmitted to the user in response to the completion of the first type of authentication; and allowing the user to rent the vehicle when both the first type of authentication and the second type of authentication are complete.

According to some embodiments, the present disclosure is directed to an example system comprising: a processor; and memory, the processor being configured to execute instructions stored in memory to: perform a first type of authentication of a user using a unique identifier for a user of a mobile device; transmit an unlock request to a vehicle controller when the first type of authentication is complete, the vehicle controller unlocking a door of the vehicle in response; perform a second type of authentication of the user; and transmit an indication to the vehicle controller of the vehicle to confirm that the second type of authentication is complete, wherein the user can rent the vehicle when both the first type of authentication and the second type of authentication are complete.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, the present disclosure is directed to systems and methods that provide two factor authentication (hereinafter "TFA") within the context of controlling access to a vehicle. In some embodiments, the TFA-based processes implemented herein allow users to rent vehicles in an automated manner and using specifically configured vehicles. Some specifically configured vehicles include human machine interfaces and physical interfaces or connectors that couple with a mobile device of a user as part of a TFA process.

It will be understood that while some embodiments disclosed herein refer to applications of the present technology for use in renting vehicles, the systems and methods herein are not so limited. That is, the systems and methods herein generally provide for secure access to vehicles or other operations thereof by a user. In one example use case, vehicles in a fleet of an enterprise can be accessed and used by an employee or other similar user using the systems and methods disclosed herein.

In various embodiments, in a fleet use scenario, the systems and methods herein can provide for restricted use of vehicles. For example, one or more employees of a company can be provided access only certain vehicles of that company's fleet as allowed by the class of the driver's license of the employee. Thus, if the employee is not certified to operate a large commercial vehicle, the systems and methods herein prevent the employee from access to such a vehicle.

Also, while the present disclosure generally discussed vehicles such as cars, these fields of use are not intended to be limiting. Thus, other types of vehicles or machinery such as boats, planes, or industrial machinery such as a skid or forklift can have controlled access through use of the present disclosure.

Some embodiments include the use of an orchestration system to provide various types of authentication. In various embodiments, the orchestration system can cause the vehicle to lock and unlock doors within the context of a TFA process. The orchestration system can also cause the vehicle to perform other actions such as horn honking, light flashing, trunk opening, engine ignition, and the like.

In some embodiments, these methods and systems allow for the vehicle to be rented and driven by a user without a key present within the vehicle. These and other advantages of the present disclosure are provided in greater detail herein with reference to the collective drawings.

Figure 1:
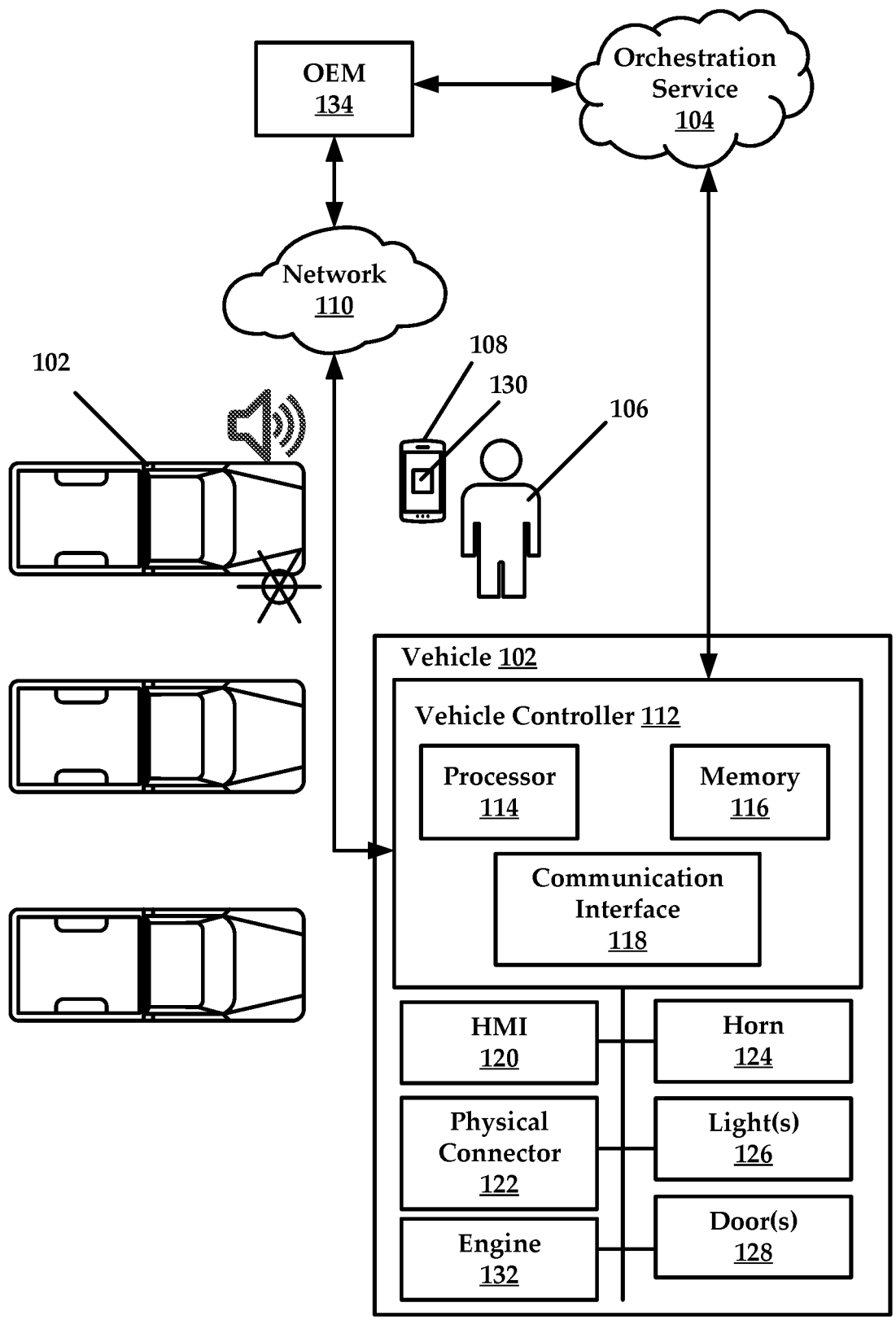
FIG. 1 is a schematic diagram of an example system constructed in accordance with the present disclosure.

FIG. 1 is a schematic representation of an example environment where aspects of the present disclosure are practiced. In one embodiment, the environment includes a vehicle 102, an orchestration service 104, a user 106, a mobile device 108, and a network 110. For context, the user 106 desires to rent the vehicle 102, which can be located amongst a plurality of other vehicles.

In general, each of the components of the environment can communicate over the network 110. The network 110 may include any one or a combination of multiple different types of networks, such as cable networks, the Internet, cellular networks, wireless networks, and other private and/or public networks. In some instances, the network 110 may include cellular, Wi-Fi, or Wi-Fi direct. In other embodiments, components of the environment can communicate using short-range wireless protocols such as Bluetooth, near-field, infrared, and the like.

Generally, the present disclosure provides an automated and secure vehicle control and/or rental method that utilizes at least two-factor authentication. Some embodiments contemplate more than two factors of authentication. In some embodiments, the vehicle 102 comprises a vehicle controller 112 that in turn comprises a processor 114, memory 116, and a communication interface 118. The vehicle 102 also can include a human machine interface (HMI 120), a physical connector 122, a horn 124, light(s) 126, door(s) 128, and an engine 132.

In various embodiments, the orchestration service 104, vehicle controller 112, and mobile device 108 cooperate to provide automated, TFA-based vehicle rental. In some embodiments, the mobile device 108 implements an application 130 that allows the user 106 to interact with the orchestration service 104. In one or more embodiments, the orchestration service 104 can be implemented as a cloud-based service, or alternatively in a physical or virtual server configuration.

In various embodiments, the orchestration service 104 is used to perform an automated, TFA-based vehicle rental process. In another embodiment, the vehicle controller 112 can be configured to perform an automated, TFA-based vehicle rental process. In yet other embodiments, the orchestration service 104 and the vehicle controller 112 can cooperatively function to perform an automated, TFA-based vehicle rental process.

According to some embodiments, when the user 106 enters an area near the vehicle 102, the user 106 utilizes the application 130 on the mobile device 108 to obtain a list of available vehicles from the orchestration service 104. Using a location of the mobile device 108 (generated natively within the mobile device), the orchestration service 104 generates the list of available vehicles near the user 106 and transmits the same for display through the application 130 on the mobile device 108. The user 106 can select the vehicle 102 from the list.

In another embodiment, rather than selecting from a list, the user 106 can enter a portion or all of a vehicle identification number (VIN) of their selected vehicle into the application 130 on the mobile device 108. The orchestration service 104 can determine if the vehicle is available for rental. In another example embodiment, the user 106 can obtain a picture of the VIN using a camera of the mobile device 108. The orchestration service 104 is configured to determine the VIN number from the photograph received from the mobile device 108.

In another embodiment, the user 106 can be assigned the vehicle 102 rather than the user being allowed to choose. In these instances, the orchestration service 104 can assist the user 106 in locating the vehicle 102 by causing the vehicle controller 112 to activate any of the horn 124 and/or the light(s) 126. This functionality is advantageous when a plurality of vehicles is present. In another example embodiment, the orchestration service 104 can provide the user 106 with a portion or all of the VIN number of the vehicle 102 through the application 130. The user 106 can use the VIN data to differentiate between vehicles and select the proper vehicle. In addition to (or in lieu of) a VIN number a license plate number can be utilized, and/or any other identifying characteristic of the vehicle.

It will be understood that prior to renting any vehicle, the user 106 creates an account with the orchestration service 104. In some embodiments, registration can be accomplished through the application 130 on the mobile device 108. Once the user is registered and an account established, the user 106 can rent a vehicle. The orchestration service 104 can generate a unique identifier for the user 106 during the account creation process.

When the vehicle 102 is selected using any of the methods described, the orchestration service 104 can perform a first type of authentication of the user 106. In this embodiment, the first type of authentication includes the orchestration service 104 verifying that the user 106 is registered (e.g., account properly created) with the orchestration service 104.

In some embodiments, the first type of authentication includes verifying the unique identifier for the user 106 that is stored in the application 130 or otherwise on the mobile device 108. The mobile device 108 transmits this unique identifier (along with the VIN information when needed) to the orchestration service 104.

If the user 106 is registered (through verification of the unique identifier), the orchestration service 104 transmits an unlock command to the vehicle controller 112. The vehicle controller 112 unlocks the door(s) 128 of the vehicle 102 in response to receiving the unlock command.

In addition to transmitting the unlock command, the orchestration service 104 also transmits a code to the application 130 of the mobile device 108. The code is used in a second type of authentication in some embodiments.

Figure 2:
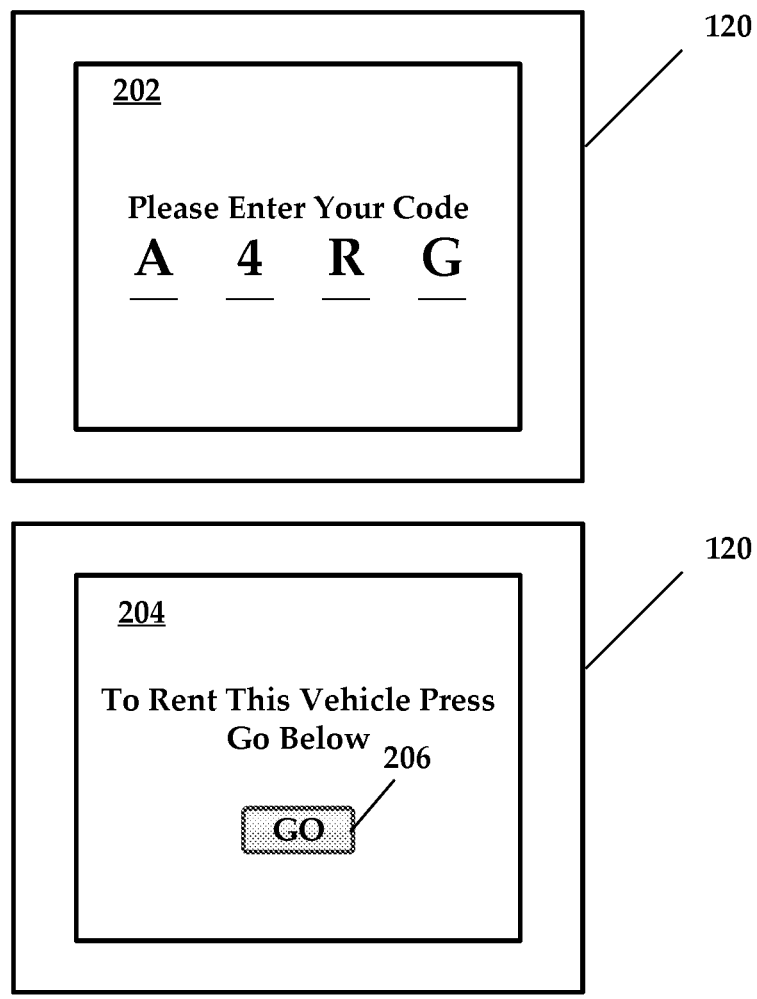
FIG. 2 illustrates various GUIs on a human machine interface.

The user 106 can enter this code into a graphical user interface (GUI) presented on the HMI 120 of the vehicle. FIG. 2 illustrates an example code entered into a GUI 202 of the HMI 120. If the code entered into the HMI 120 matches the code generated by the orchestration service 104, the user 106 is presented with another GUI 204 where the user 106 can select a button 206 to confirm that they desire to rent the vehicle 102. To be sure, this is merely an example of how a user could indicate that they wish to rent the vehicle is not intended to be limiting.

In one or more embodiments, when the code entered into the HMI 120 matches the code generated by the orchestration service 104 and presented to the application 130, the orchestration service 104 can transmit a vehicle start command to the vehicle controller 112. The vehicle controller 112 can start the engine 132 of the vehicle 102 in response and the user 106 can drive the vehicle away.

In some embodiments, another factor of authentication could include the user 106 plugging their mobile device 108 into the physical connector 122 of the vehicle 102. In some instances, the plugging of the mobile device 108 into the physical connector 122 of the vehicle 102 can replace the code matching process and thus serve as the second factor of authentication. In such an embodiment the vehicle controller 112 and/or the orchestration service 104 can verify aspects of the mobile device 108 or application 130, as will be discussed in greater detail infra.

In one embodiment, the physical connector 122 includes a wired connection that couples the mobile device 108 with, for example, an onboard diagnostics (OBD) port. In another embodiment, the physical connector 122 includes a wired connection that couples the mobile device 108 with, for example, the HMI 120. In yet another embodiment, the physical connector 122 includes a wired connection that couples the mobile device 108 with, for example, the vehicle controller through a universal serial bus (USB) connector or auxiliary port in a dashboard or console of the vehicle 102.

In some embodiments, when the mobile device 108 is connected through the physical connector 122, the vehicle controller 112 can obtain the code and transmit the code to the orchestration service 104 as the second type of authentication rather than requiring the user 106 to type the code into the HMI 120.

According to some embodiments, the vehicle controller 112 can be configured to sense a paired presence of the mobile device 108 during vehicle operations. This can include sensing a connection over the physical connector 122 or a connection over a short-range wireless connection. If the mobile device 108 that initiated the initial authentication is not present, the HMI 120 can present a WARNING that the authentication device (e.g., mobile device 108) is not detected and/or provide direction to the user to return the vehicle 102. This will ensure that only paying renters/authorized drivers only are allowed to operate the vehicle. In another advantage, this prevents the driver or user from driving away and inadvertently forgetting their mobile device 108.

As briefly mentioned above, rather than using a code, the second type of authentication includes the mobile device 108 being connected through the physical connector 122. The vehicle controller 112 reads the unique code referenced above that was used to perform the first type of authentication and provides this unique code that was read directly off of the mobile device 108 by the vehicle controller 112. When this unique code matches the unique code generated by the orchestration service 104 the user 106 is authenticated a second time. Rather than using the unique code a second time, the user 106 can be authenticated a second time by other data such as an International Mobile Equipment Identity (IMEI) of the mobile device 108 or a code that is embedded into the application 130 of the mobile device 108. Another type of immutable value related to the mobile device 108 can also be used. This information can be gathered and stored in the orchestration service 104 when the user 106 creates an account.

In an example general use case, the orchestration service 104 is a system that is configured to perform a first type of authentication of a user using a unique identifier for a user of a mobile device. Next, the orchestration service 104 transmits an unlock request to a vehicle controller when the first type of authentication is complete. The vehicle controller unlocks a door of the vehicle in response. Next, the orchestration service 104 performs a second type of authentication of the user and then transmits an indication to the vehicle controller of the vehicle to confirm that the second type of authentication is complete. Thus, the user can rent the vehicle when both the first type of authentication and the second type of authentication are complete by the orchestration service 104.

In another example general use case, the vehicle controller 112 is a system that is configured to receive an indication of a first type of authentication being completed by the orchestration service 104. Next, the vehicle controller 112 receives an unlock command when the first type of authentication is complete. Next, the vehicle controller 112 is configured to receive an indication of a first type of authentication being completed by the orchestration service 104. This may also include receiving an engine start command from the orchestration service 104. In one example, the message that indicates that the first type of authentication is complete is coupled with an unlock command and the message that indicates that the second type of authentication is complete is coupled with an engine start command.

During the term of the rental, the user 106 can utilize the application 130 to lock and/or unlock the vehicle 102, start the engine 132 of the vehicle 102, and so forth. These functionalities remain active until the user 106 indicates that they wish to terminate the rental period.

In some embodiments it will be understood that the user 106 does not need to be in possession of a key for the vehicle 102 in order to rent and drive the same. After the vehicle has been rented, in some embodiments, each time the vehicle 102 experiences a turn off event, the vehicle controller 112 can present the user 106 with a message through the HMI 120 (or through the application 130) that queries the user 106 as to whether the user 106 desires to continue or terminate the rental.

In some embodiments, the user 106 may be required, as directed by applicable laws, to select or agree to various rental provisions such as insurance, damage waivers, fueling agreements, and so forth. One of ordinary skill in the art will appreciate that these requirements may vary per locale such as by state or country.

According to some embodiments, rather than requiring the orchestration service 104 to perform each factor of authentication, the vehicle controller 112 can be configured to perform one or more of the types of authentication. In one embodiment, the orchestration service 104 performs the first type of authentication, which can include any of the methods described above in order for the door(s) 128 of the vehicle 102 to be unlocked. The second factor of authentication can be completed by the vehicle controller 112. For example, the vehicle controller 112 can generate a random code that is transmitted to the mobile device 108 over a short-range wireless connection via the communication interface 118. The user 106 can enter this code into the HMI 120 of the vehicle 102.

In another embodiment, when the application 130 is active on the mobile device 108, the mobile device 108 can communicate with the vehicle controller 112 when the mobile device 108 is proximate (e.g., within short-range wireless connectivity range). The vehicle controller 112 can be configured to acknowledge a code received over a short-range wireless connection in order to unlock the door(s) 128 of the vehicle 102, as a first type of authentication. The orchestration service 104 can perform a second type of authentication using any of the methods described herein.

According to some embodiments, the environment of FIG. 1 can also generally include an original equipment manufacturer (OEM) connectivity service or system (OEM 134). In general, some vehicle manufacturers provide a connectivity service that can be used to control certain aspects of vehicle operation. For example, these systems can provide door locking/unlocking, engine start/stop, and other services. In some embodiments, rather that utilizing the orchestration service 104 to issue commands to the vehicle controller 112, the orchestration service 104 can interface with the OEM 134. For example, the orchestration service 104 can be used to perform TFA methods and potentially driver restriction while the OEM 134 is used to issue commands to the vehicle controller 112. Thus, rather than directly issuing commands to the vehicle controller 112, the orchestration service 104 indirectly issues commands to the vehicle controller 112 using the OEM 134. For example, the orchestration service 104 can indicate to the OEM 134 that an unlock command is to be transmitted to the vehicle controller 112. The OEM 134 sends the unlock command in response. In sum, the orchestration service 104 can use the OEM 134 as a proxy to interact with the vehicle controller 112.

Figure 3:
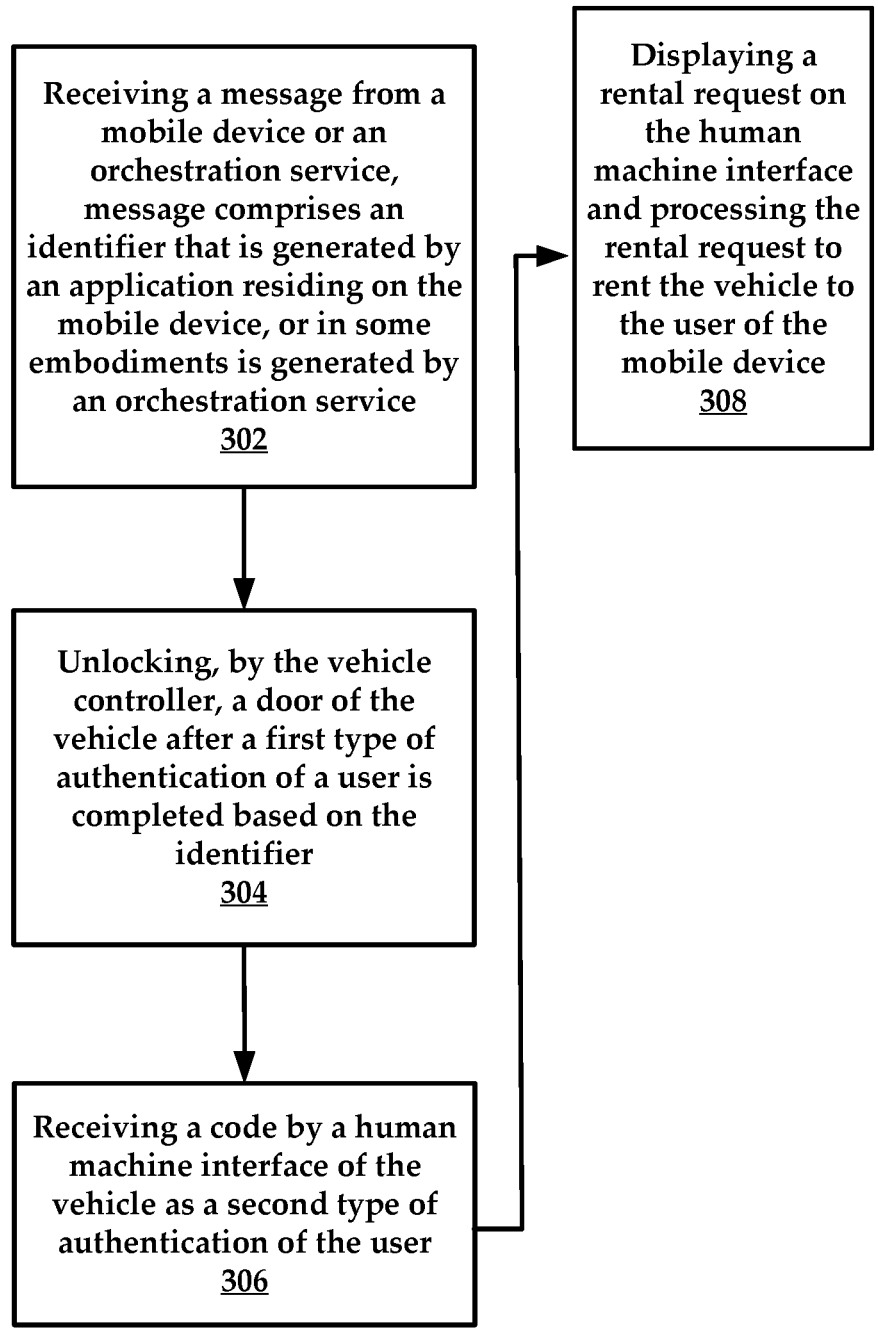
FIG. 3 is a flowchart of an example method of the present disclosure.

FIG. 3 is a flowchart of an example method of the present disclosure. The method, in this example, is performed from the perspective of the vehicle controller as described above. In one embodiment, the method includes a step 302 of receiving a message from a mobile device or an orchestration service.

The message comprises an identifier that is generated by an application residing on the mobile device, or in some embodiments is generated by an orchestration service. The identifier can correspond to a unique identifier created for the user by the orchestration system when the user created an account. In some the message is received when the mobile device is within proximity to a vehicle controller of a vehicle.

Next, the method includes a step 304 of unlocking, by the vehicle controller, a door of the vehicle after a first type of authentication of a user is completed based on the identifier.

In various embodiments, the method includes a step 306 of receiving a code by a human machine interface of the vehicle as a second type of authentication of the user. The code can be transmitted to the mobile device by a cloud service.

In various embodiments, the method can include a step 308 of displaying a rental request on the human machine interface and processing the rental request to rent the vehicle to the user of the mobile device.

In yet another embodiment, the rental request is displayed on the mobile device and processing of the rental request is performed in order to rent the vehicle to the user of the mobile device.

In one or more embodiments verifying the identifier is considered the first type of authentication, and this verification can be performed if the user is registered with the cloud service. The unlock request is received from the cloud service after the first type of authentication is complete.

Figure 4A:
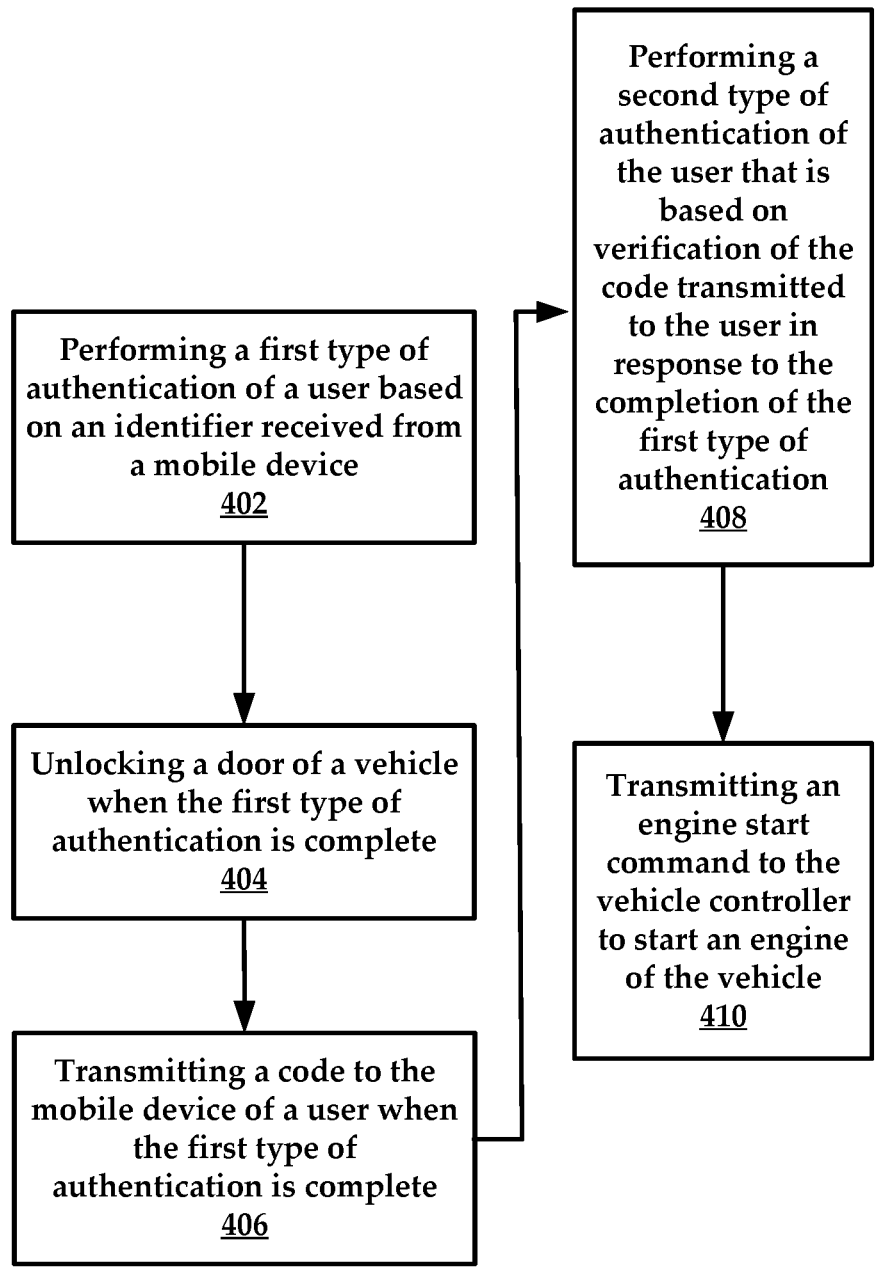
FIG. 4A is a flowchart of another example method of the present disclosure.

FIG. 4A is a flowchart of another example method of the present disclosure. This method is performed by an example orchestration service of the present disclosure. In one embodiment, the method includes a step 402 of performing a first type of authentication of a user based on an identifier received from a mobile device. This first type of authentication can include any of the methods for authentication described herein.

Next, the method includes a step 404 of unlocking a door of a vehicle when the first type of authentication is complete. This step can be performed indirectly as the orchestration service can transmit an unlock command to the vehicle controller when the first type of authentication is complete.

The method can include a step 406 of transmitting a code to the mobile device of a user when the first type of authentication is complete. In certain embodiments, the method includes a step 408 of performing a second type of authentication of the user that is based on verification of the code transmitted to the user in response to the completion of the first type of authentication. In one embodiment, the user enters the code they received on their mobile device into an HMI of the vehicle. The vehicle forwards this code to the orchestration service and the orchestration service confirms that the code received through the HMI correspond to the code transmitted to the mobile device.

Thus, the method can include steps such as presenting a graphical user interface on a human machine interface of the vehicle, receiving, by a human machine interface of the vehicle, the code, verifying the code by the cloud service, and receiving an indication from the cloud service that the code received by the human machine interface is verified. These steps are performed by the vehicle controller but have corresponding steps that are performed by the orchestration service.

In various embodiments, once the first and second types of authentication have been completed, the method includes a step 410 of transmitting an engine start command to the vehicle controller to start an engine of the vehicle.

In some embodiments, the second type of authentication further comprises a step of sensing connection of the mobile device with a physical interface of the vehicle and then verifying any of the identifier of the mobile device or a complete vehicle identification number of the vehicle.

In one or more embodiments, prior to step 402 of the method, the method can include processes such as the orchestration service determining a location of the mobile device and providing a list of vehicles that includes the vehicle to the an application executing on the mobile device. To be sure, the list of vehicles is based on the location. The method includes receiving a selection of the vehicle from the application executing on the mobile device and providing a portion of a vehicle identification number of the vehicle to the application executing on the mobile device. This allows the user to verify the identity of the vehicle to which they have been assigned.

Figure 4B:
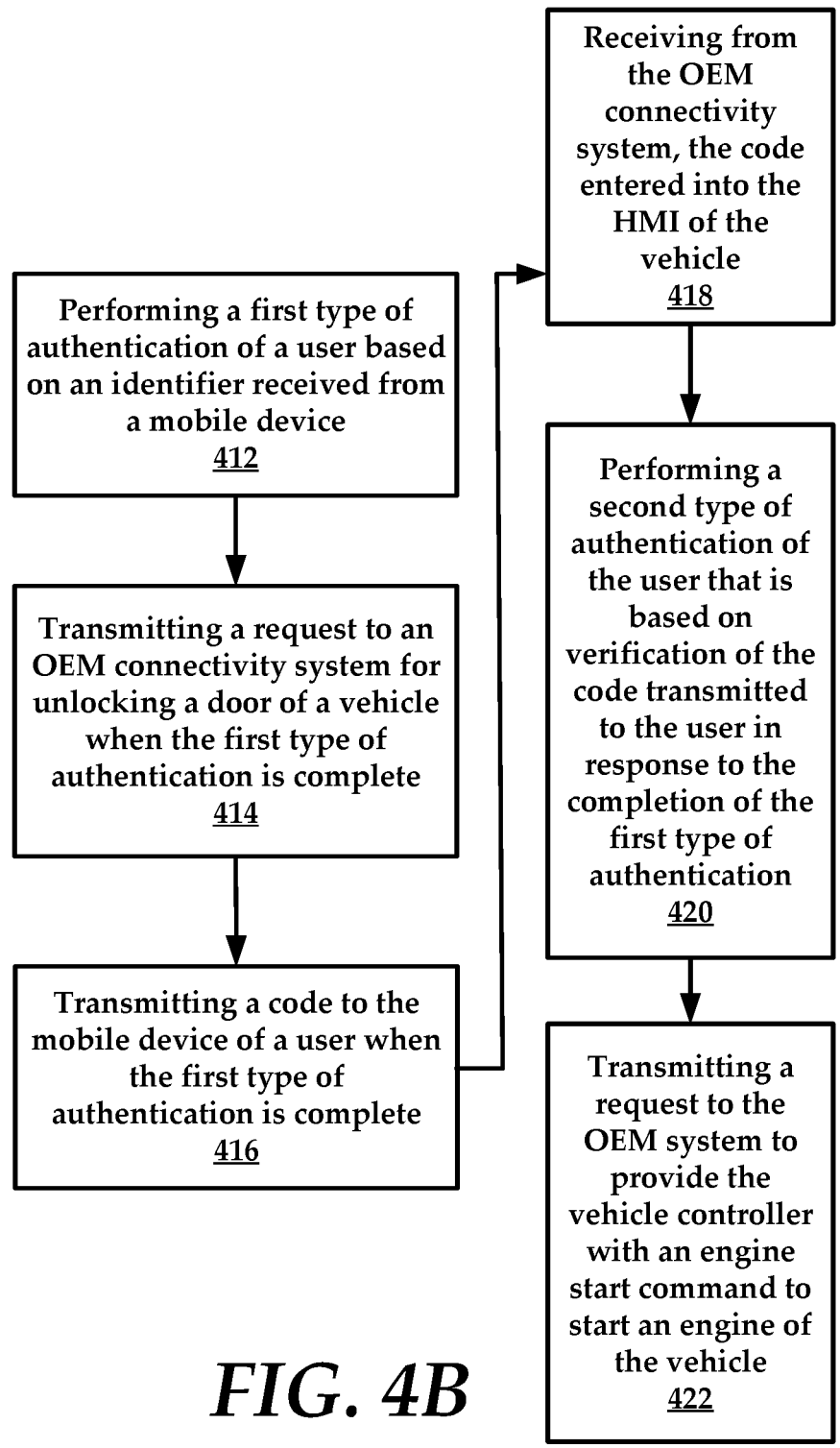
FIG. 4B is a flowchart of another example embodiment using OEM control.

FIG. 4B is a flowchart of another example method of the present disclosure that involves using an OEM system for vehicle control. This method is performed by an example orchestration service of the present disclosure in combination with an OEM connectivity system. In one embodiment, the method includes a step 412 of performing a first type of authentication of a user based on an identifier received from a mobile device. This first type of authentication can include any of the methods for authentication described herein.

Next, the method includes a step 414 of transmitting a request to an OEM connectivity system for unlocking a door of a vehicle when the first type of authentication is complete. This step can be performed indirectly as the orchestration service can transmit an unlock command to OEM connectivity service when the first type of authentication is complete. The OEM connectivity service completes the unlock command request to the vehicle controller.

The method can include a step 416 of transmitting a code to the mobile device of a user when the first type of authentication is complete. In one embodiment, the user enters the code they received on their mobile device into an HMI of the vehicle. The vehicle forwards this code to the orchestration service and the orchestration service confirms that the code received through the HMI correspond to the code transmitted to the mobile device.

In some embodiments, this forwarding is performed through use of the OEM connectivity system. Thus, in some instances, the method includes a step 418 of receiving from the OEM connectivity system, the code entered into the HMI of the vehicle.

In certain embodiments, the method includes a step 420 of performing a second type of authentication of the user that is based on verification of the code transmitted to the user in response to the completion of the first type of authentication.

Thus, the method can include steps such as presenting a graphical user interface on a human machine interface of the vehicle, receiving, by a human machine interface of the vehicle, the code, verifying the code by the cloud service, and receiving an indication from the cloud service that the code received by the human machine interface is verified. These steps are performed by the vehicle controller but have corresponding steps that are performed by the orchestration service.

In various embodiments, once the first and second types of authentication have been completed, the method includes a step 422 of transmitting a request to the OEM system to provide the vehicle controller with an engine start command to start an engine of the vehicle. To be sure, in some embodiments, the orchestration service can issue this command directly in some embodiments.

In some embodiments, the second type of authentication further comprises a step of sensing connection of the mobile device with a physical interface of the vehicle and then verifying any of the identifier of the mobile device or a complete vehicle identification number of the vehicle.

In one or more embodiments, prior to step 402 of the method, the method can include processes such as the orchestration service determining a location of the mobile device and providing a list of vehicles that includes the vehicle to the an application executing on the mobile device. To be sure, the list of vehicles is based on the location. The method includes receiving a selection of the vehicle from the application executing on the mobile device and providing a portion of a vehicle identification number of the vehicle to the application executing on the mobile device. This allows the user to verify the identity of the vehicle to which they have been assigned.

As noted above, this method can also include a step where the orchestration service performs a security check prior to allowing the user to have access to the vehicle. That is, the orchestration service can store credentials such as driver's license in the user's account. If the user does not possess the requisite credentials, the user is not allowed to operate or access the vehicle.

In some embodiments, a driver may be unable to unlock a vehicle using the TFA process described herein. In these embodiments, the driver may be enabled to use a vehicle key to unlock and/or drive the vehicle without explicitly authenticating in advance. This may be necessary in any number of scenarios, such as the vehicle being located in a risky environment, or adverse weather. In other scenarios, the driver may be unable to use a mobile device due to misplacement of the mobile device or insufficient battery charge of the mobile device.

When a driver is unable to utilize the TFA authentication process, the driver may be automatically authenticated to the assigned vehicle after the driver begins driving the vehicle. The orchestration service 104 can track a vehicle 102 and locate it in real-time using a GPS signal of the vehicle 102. The orchestration service 104 can also track a mobile device 108 and locate it in real-time using a GPS signal of the mobile device 108.

In an exemplary embodiment, orchestration service 104 can detect that a vehicle 102 is moving without any driver logging in or being authenticated in advance. Orchestration service 104 can then track which mobile device 108 operating application 130 is present in the vicinity of the vehicle 102. After a certain period of time has elapsed, orchestration service 104 may determine that user 106 associated with mobile device 108 in the vicinity of vehicle 102 is driving the vehicle, and automatically determine that user 106 is the driver of vehicle 102 and subsequently automatically authenticate and associate the driver with the vehicle for the driving session. In some embodiments, orchestration service 104 can also automatically begin tracking information and populating a commercial driver logbook for the driver.

Thus, the orchestration service 104 can track a movement of a vehicle 102 and also a movement of a mobile device 108 and determine that the two are moving in sync. As such, orchestration service 104 can assume that the user 106 associated with mobile device 108 is driving the vehicle 102.

In some embodiments, orchestration service 104 may track multiple mobile devices operating application 130 in the vicinity of vehicle 102, which is moving without any prior authentication of a driver, such as using the TFA authentication process discussed herein. In this embodiment, orchestration service 104 may send a message to each mobile device in the vicinity of the vehicle at substantially the same time and query if each user is driving the vehicle via a pop-up notification on the mobile device, a text message, or the like. Each user may simply select a "yes" button or a "no" button to answer whether they are the ones driving the vehicle. In another embodiment, the query may be posed to a user as audio, which the user may reply to with a voice answer of "yes" or "no". In this way, the driver does not have to take their eyes off the road to read the message on the mobile device and answer it.

In some embodiments, orchestration service 104 may continue to send the query to each user whose mobile device is in the vicinity of the vehicle at a periodic time interval until one person affirmatively answers the query as the driver of the vehicle.

In further embodiments, orchestration service 104 may send the query to a human machine interface of the vehicle, instead of or in addition to a mobile device. A user may affirmatively answer the query that they are the driver of the vehicle from the human machine interface of the vehicle itself. Thus, the driver may be authenticated for that driving session even if their mobile device is unavailable.

In an exemplary embodiment where multiple user's mobile devices are tracked to be in sync with vehicle 102, and no user answers affirmatively that they are driving the vehicle, orchestration service 104 may determine that a default user is the driver and proceed to automatically authenticate that person to the vehicle. If the driver is registered as a commercial driver in the system, then orchestration service 104 may further automatically populate a commercial driver logbook for that person.

In various embodiments, any or all of the functions described herein for automatic authentication may be performed by the vehicle controller 112, instead of orchestration service 104. Further, a fleet manager of a fleet of vehicle may enable the automatic authentication methods discussed herein to allow for this functionality for use of vehicles instead of two-factor authentication for any one or more specific vehicles, one or more specific drivers, or a group of vehicles or drivers.

While GPS signal has been discussed herein as the mechanism for tracking a vehicle and also tracking a mobile device, any other mechanism may be used to track a vehicle or mobile device other than GPS, in other embodiments.

Figure 5:
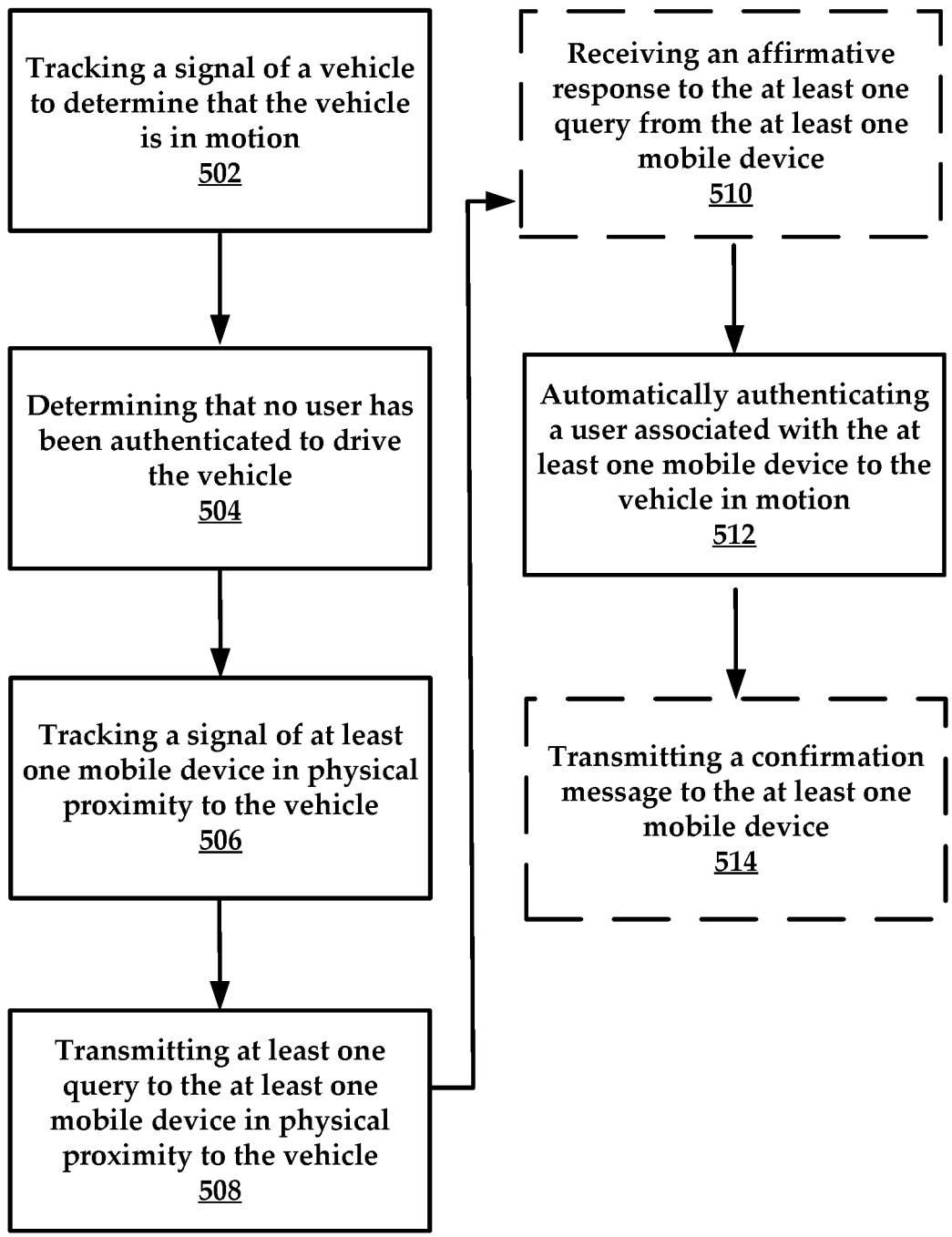
FIG. 5 is a flowchart of another example embodiment of the present disclosure.

FIG. 5 is a flowchart of an example method of the present disclosure. The method, in this example, is performed from the perspective of the orchestration service as described herein. In some embodiments, some or all of the steps may be performed by the vehicle controller, as described herein. Further, the steps may be performed in any order other than what is depicted in the exemplary figure.

In step 502, the method begins with tracking a signal of a vehicle to determine that the vehicle is in motion. As discussed herein, a GPS signal of the vehicle may be tracked in exemplary embodiments. In step 504, a determination may be made that no user has been authenticated to drive the vehicle. While step 504 is depicted as subsequent to step 502, it may actually occur prior to step 502 in various embodiments. In step 506, a signal of at least one mobile device may be tracked to be in physical proximity to the vehicle. The signal of the at least one mobile device may also be determined to be moving in sync with the signal of the vehicle.

In step 508, at least one query is transmitted to the at least one mobile device that is moving in sync with the vehicle. The query requests confirmation from a user associated with the mobile device that that person is driving the vehicle. In optional step 510, an affirmative response is received from at least one mobile device to the at least one query. In step 512, a user associated with at least one mobile device moving in sync with the vehicle is automatically authenticated to the vehicle. In optional step 514, a confirmation message is transmitted to the at least one mobile device that the associated user has been automatically authenticated to the vehicle for the driving session.

Figure 6:
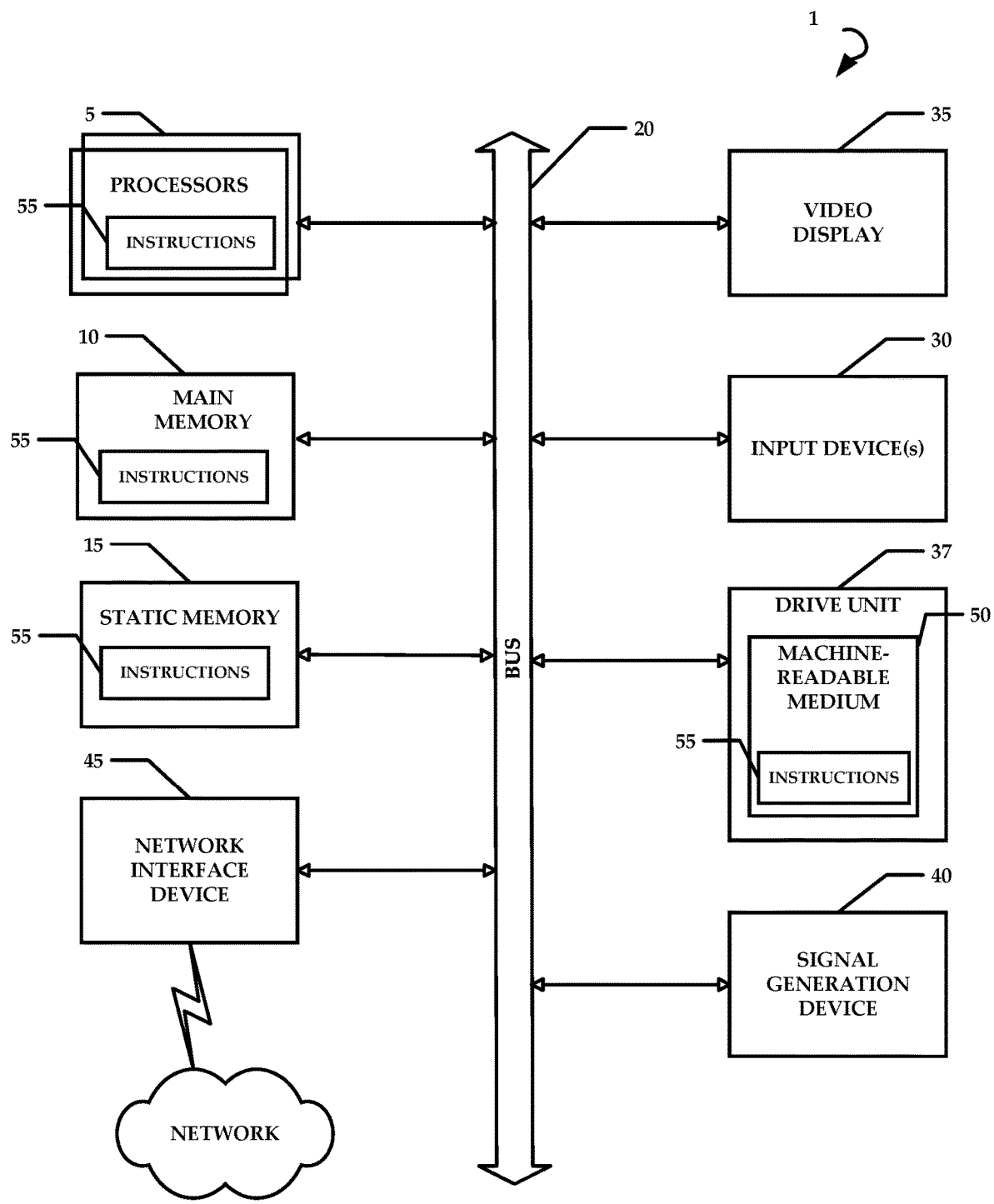
FIG. 6 is a diagrammatic representation of an example machine in the form of a computer system.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer, or section. Thus, a first element, component, region, layer, or section discussed below could be termed a second element, component, region, layer, or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention.

However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale. While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for automatically authenticating a user to a vehicle, the method comprising:
   tracking a GPS signal of a vehicle to determine that the vehicle is in motion;
   determining that no user has been authenticated to drive the vehicle;
   tracking a GPS signal of at least one mobile device in physical proximity to the vehicle;
   transmitting at least one query to the at least one mobile device, asking whether a user associated with the at least one mobile device is driving the vehicle; and
   automatically authenticating the user associated with the at least one mobile device to the vehicle.

2. The method of claim 1, further comprising:
   determining that the automatically authenticated user is a commercial driver for the vehicle; and
   automatically populating a commercial driver logbook for the user.

3. The method of claim 1, further comprising:
   receiving an affirmative response to the at least one query from one mobile device of the at least one mobile device.

4. The method according to claim 3, further comprising:
   displaying a rental request on a human machine interface of the vehicle; and
   processing the rental request to rent the vehicle to the user of the mobile device.

5. The method according to claim 3, further comprising:
   displaying a rental request on the one mobile device of the at least one mobile device; and
   processing the rental request to rent the vehicle to the user of the one mobile device.

6. The method of claim 1, further comprising:
   receiving no affirmative response to the at least one query from the at least one mobile device; and
   determining a default user for the vehicle and an associated mobile device of the at least one mobile device.

7. The method of claim 1, wherein the at least one mobile device is registered with a cloud service prior to using the vehicle.

8. The method of claim 1, wherein the user associated with the at least one mobile device is registered with a cloud service prior to using the vehicle.

9. The method of claim 1, wherein the at least one query to the at least one mobile device is at least one of a pop-up notification, text message, or audio message.

10. The method of claim 1, wherein the at least one query is transmitted to the at least one mobile device at a periodic time interval until an affirmative response is received to the at least one query.

11. The method of claim 1, wherein the automatically authenticating the user associated with the at least one mobile device to the vehicle further comprises: automatically matching an identifier associated with the at least one mobile device as being authorized for use with the vehicle.

12. The method of claim 1, further comprising,
    transmitting a confirmation message to the at least one mobile device that the associated user has been automatically authenticated to the vehicle for a driving session.

13. A method for automatically authenticating a user to a vehicle, the method comprising:
- tracking a GPS signal of a vehicle to determine that the vehicle is in motion;
- determining that no user has been authenticated to drive the vehicle;
- tracking a GPS signal of at least one mobile device in physical proximity to the vehicle;
- transmitting at least one query to a human machine interface of the vehicle, asking whether a user associated with the at least one mobile device is driving the vehicle; and
- automatically authenticating the user associated with the at least one mobile device to the vehicle.

14. The method of claim 13, further comprising:
- determining that the automatically authenticated user is a commercial driver for the vehicle; and
- automatically populating a commercial driver logbook for the user.

15. The method of claim 13, further comprising:
- receiving an affirmative response to the at least one query from the human machine interface of the vehicle.

16. The method of claim 13, further comprising:
- receiving no affirmative response to the at least one query from the human machine interface of the vehicle; and
- determining a default user for the vehicle and an associated mobile device of the at least one mobile device.

17. The method of claim 13, wherein the user associated with the at least one mobile device is registered with a cloud service prior to using the vehicle.

18. The method of claim 13, wherein the at least one query to the human machine interface of the vehicle is at least one of a pop-up notification or audio message.

19. The method of claim 13, wherein the at least one query is transmitted to the human machine interface of the vehicle at a periodic time interval until an affirmative response is received to the at least one query.

20. A system, comprising:
- a processor; and
- memory, the processor being configured to execute instructions stored in memory to:
  - track a GPS signal of a vehicle to determine that the vehicle is in motion;
  - determine that no user has been authenticated to drive the vehicle;
  - track a GPS signal of at least one mobile device in physical proximity to the vehicle;
  - transmit at least one query to the at least one mobile device, asking whether a user associated with the at least one mobile device is driving the vehicle; and
  - automatically authenticate the user associated with the at least one mobile device to the vehicle.

* * * * *